June 20, 1967
A. NORWICH
3,327,207
TWO FREQUENCY SYSTEM FOR MEASURING A PROPERTY OF A DIELECTRIC
MATERIAL HAVING A SINGLE AMPLIFYING AND DETECTING
CIRCUIT FOR BOTH FREQUENCIES
Filed March 29, 1963
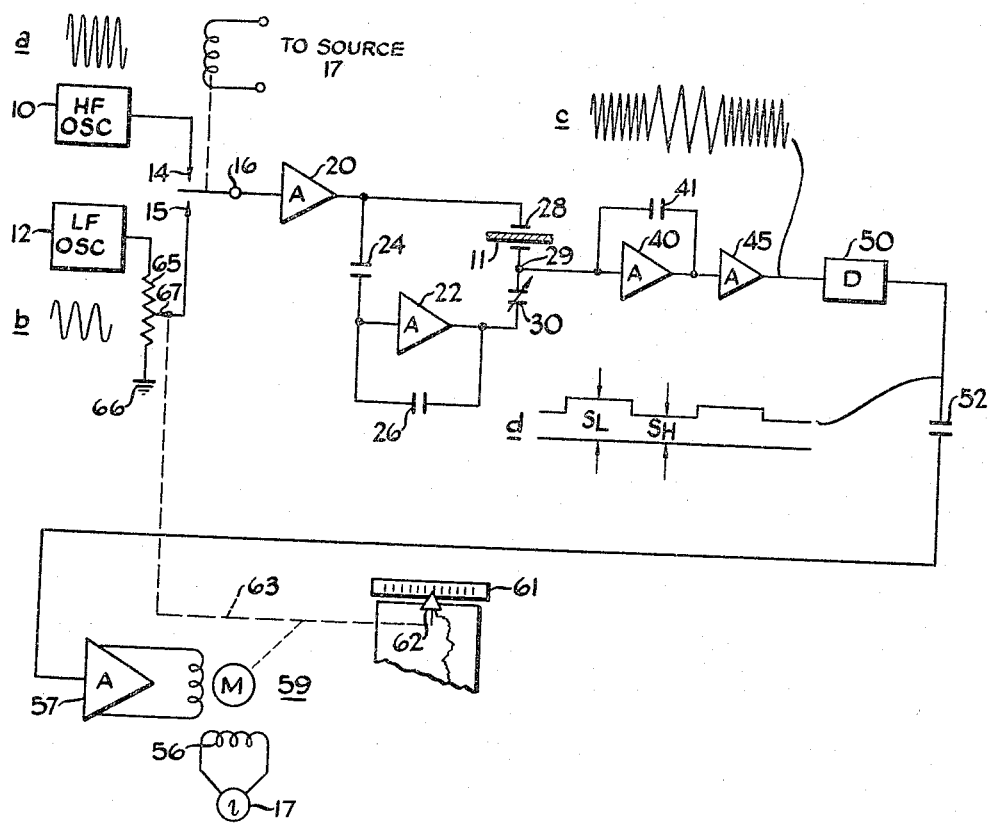
INVENTOR.
Alan Norwich
BY Anderson, Luedeka,
Fitch, Even & Tabin
ATTORNEYS

United States Patent Office 3,327,207
Patented June 20, 1967

3,327,207
TWO FREQUENCY SYSTEM FOR MEASURING A PROPERTY OF A DIELECTRIC MATERIAL HAVING A SINGLE AMPLIFYING AND DETECTING CIRCUIT FOR BOTH FREQUENCIES
Alan Norwich, Columbus, Ohio, assignor to Industrial Nucleonics Corporation, a corporation of Ohio
Filed Mar. 29, 1963, Ser. No. 268,909
8 Claims. (Cl. 324—61)

This application is a continuation-in-part of the copending application of Alan Norwich, Ser. No. 174,745, filed Feb. 21, 1962, for "Measuring System," now abandoned.

This invention relates generally to a measurement system having a plurality of signals at different frequencies applied to a capacitance probe, and specifically to a simplified detector circuit for use in such a system.

The present invention is an improvement on the system described in the copending application Ser. No. 41,975, filed July 11, 1960, for "Measuring System," by Albert F. G. Hanken, now United States Patent 3,155,900, issued Nov. 3, 1964. In that system the capacitance probe forms part of a bridge circuit. The probe includes as a dielectric the material to be measured in an industrial process. The bridge is simultaneously supplied with a pair of signals at separate frequencies, that is, the capacitive arms of the bridge have applied at their outer terminals balanced voltages at widely displaced frequencies. There is produced across the bridge a pair of signals at the respective frequencies but at an amplitude varying in accordance with the unbalance of the bridge at each frequency. The unbalanced signals are amplified in a wideband amplifier and then applied to a pair of filters. One filter is adapted to select the signal at the first frequency and pass it to a first detector. The output of the first detector is a D.C. signal of a magnitude varying in accordance with the amplitude of the signal at the first frequency. In a similar manner the other filter is adapted to select the signal at the second frequency and pass it to a second detector. The output of the second detector is a D.C. signal of a magnitude varying in accordance with the amplitude of the signal at the second frequency. The two signals at the output of the two detectors are then applied to a computer for indicating a response relating to a qualitative or quantitative property of the material in the capacitance probe.

In the copending application of Ko-Hsin Liu Ser. No. 174,917, filed Feb. 21, 1962, for "Measuring System," now United States Patent 3,255,412, issued June 7, 1966, there is disclosed a modification of the aforementioned Hanken application. In the system of the Lieu application, the signals are sampled alternately, and the output signals of an A.C. summing amplifier are synchronously fed into a pair of demodulator circuits; the demodulated signals are then compared.

The system of the present invention is a further modification of the aforementioned Hanken system in that only a single amplifying and detecting circuit is used for both signals. In this system, since only the ratio of the signals is of importance, changes in gain of the system or nonlinearities will affect both signals equally leaving the ratio unchanged. Further, synchronous demodulation of the two signals is not required to separate the two signals for application to separate detectors. Finally, the number of circuit components is reduced.

Accordingly, it is a primary object of the present invention to provide a new and improved dual frequency measurement system.

Another object of the present invention is to simplify the measurement circuitry in a dual frequency measurement system.

Still another object of the present invention is to provide a dual frequency measurement system having but a single amplifying and detecting circuit for both frequencies.

Other objects and features of the present invention will become apparent from the following detailed description when taken in conjunction with the single figure drawing illustrating a preferred embodiment of my invention.

Referring now to the drawings, a pair of oscillator generators 10 and 12 are operative to produce a pair of signals represented by waveforms $a$ and $b$, respectively. These signals are at widely displaced frequencies and are referred to hereinafter as the high and low frequency signals, respectively. It is preferred in the system of the present invention to apply the two signals alternately to a bridge excitation amplifier 20, as disclosed in the aforementioned Liu application. This is accomplished with a switch 16 having alternate contacts 14 and 15. This switch may be an electrical-mechanical switch such as a chopper or may be an electronic switch. It is operated periodically from power supplied from A.C. source 17 at a frequency much lower than the aforesaid low frequency. Conveniently, source 17 may be a 60 c.p.s. source.

The amplifier 20 amplifies the signals to the desired amplitude and then feeds the signals through capacitor 24 into the phase inverting amplifier 22 which reverses the phase to obtain substantially exactly 180° phase reversed signals at both the low and high frequencies. The amplifier 22 may have a feedback loop though a capacitor 26. The signals at the two frequencies are then alternately applied from amplifier 20 to one plate of capacitance probe 28. The material 11 under measurement forms a part of the dielectric of the capacitance probe 28. Although the material is shown in the drawing as being between the plates of the probe, the probe can as well be a fringe field capacitor with both plates on the same side of the dielectric.

At the same time, the phase reversed signals are applied to one of the plates of a balancing capacitor 30. The other plate of probe 28 is connected at measuring terminal 29 to the other plate of capacitor 30, and the output is taken from this terminal. In the preferred form of this invention, the capacitance of capacitor 30 and the amplitude of the phase reversed signals are adjusted so that, when there is no material under measurement in the probe 28, the bridge is balanced and there is no output signal at either frequency at the terminal 29. The circuit for developing and applying the phase reversed signals may be as described in greater detail in the copending application of Alan Norwich, Ser. No. 174,748, filed Feb. 21, 1962, for "Measuring System."

Although impedances 24 and 26 are preferably pure capacitors, they may also be pure resistors or even mixed elements. The important criterion is that both of the impedances be like. They need not be equal, but they should introduce substantially the same phase shift at each frequency. The current through the input impedance 24 must flow through the feedback impedance 26 with no current flowing into the amplifier itself. In this case, if the impedances are like, the voltage at the output of the amplifier is of opposite phase from the input voltage but equal to the input voltage divided by the ratio of the input impedance to the feedback impedance. This ratio should be real at all frequencies; that is, the feedback impedance should be substantially like the input impedance 24, although its magnitude may be greater or smaller, in order that they not introduce appreciable phase shift in addition to the 180° phase shift of the amplifier 22. As used herein, like does not necessarily imply the same magnitude.

As an illustration of the operation of the present invention, moisture measurement is considered. With the bridge balanced as above and with equal signals applied at each frequency, when the material 11 contains no moisture, the high frequency signal ($S_H$) developed at terminal 29 will be of the same amplitude as the low frequency signal ($S_L$); that is, $S_H = S_L$. If moisture were to be introduced into the material 11, the low frequency signal would increase more than the high frequency signal ($S_L > S_H$). However, if only the mass of the material were to be increased, both the high and the low frequency signals would increase, but the ratio of the one signal to the other would remain constant.

The signals of both frequencies developed at terminal 29 are applied to amplifier 40 which may have a feedback loop through a capacitor 41. The signals may be further amplified by an amplifier 45 and applied to a high and low frequency detector 50. The amplifier 45 may be provided with automatic gain control, as by an AGC connection from the output of the detector 50. This is desirable where there is a substantial variation in the weights of materials to be measured. This prevents overloading of detector 50, and also eliminates the tendency of the servo system controlled by the detector to oscillate, at the high signal levels associated with heavy materials. It also prevents the sluggish and unresponsive action of the servo which would obtain with the low signal levels associated with light materials.

Detector 50 may comprise a rectifier and filter. The input to detector 50 may be as shown at $c$; it comprises alternate portions at the high and low frequencies, with the portions alternating at the frequency of the switch 16. Detector 50 acts upon the signals at each frequency to provide a pair of unidirectional signals of the same polarity each signal corresponding to the signals at one of the input frequencies. The pair of unidirectional signals alternate as the switch 16 alternates the input signals. Each unidirectional signal is filtered to provide a steady signal which may be considered D.C., but the time constant of the filter is such that the alternation of the two unidirectional signals is not filtered out. This is readily achieved, since the frequency of alternation is much less than the low frequency signals applied by oscillator 12. Ideally, the resulting signal is a square wave of the frequency of switch 16, as shown at $d$, where $S_L$ corresponds to the low frequency signal developed at terminal 29 and $S_H$ corresponds to the high frequency signal developed at terminal 29.

By eliminating the D.C. component from this wave through capacitor 52, there will result a 60 c.p.s. fluctuating voltage (A.C. component) related to the moisture content of the material 11. This fluctuating voltage, amplified in amplifier 57 is utilized to drive the 60 c.p.s. servo motor 59. The motor shaft 63 of the servo motor 50 is linked to the variable tap 67 of the potentiometer 65 which is grounded at 66. The servo motor 59 is driven in a direction and for a period of time to readjust the potentiometer 65, which in turn adjusts or controls the amplitude of the low frequency voltage that is applied to the measuring bridge. The adjustment is continued until the high frequency signal and the low frequency signal appearing at the bridge output terminal 29 are equal. When this occurs the square wave $d$ will no longer appear and consequently the servo motor 59 will no longer be energized.

The direction of the rotation of the servo motor 59 is dependent upon the phase of the square wave $d$. The phase in turn is determined by whether the low frequency signal or the high frequency signal at the detector is of greater amplitude. The servo motor 59 continuously compares the phase of the square wave with the phase of the voltage applied from source 17 to its reference winding 56.

Also linked to the motor shaft 63 is a recording pen 62 coupled to a read-out scale 61. Therefore, the position of the servo potentiometer is read directly on the read-out scale 61; and since the position of the servo potentiometer is an indication of the ratio of the high frequency signal to the low frequency signal, this ratio may be read out on this scale. Again since this ratio directly correlates with the moisture content of the material 11, as described in the aforesaid Hanken application Ser. No. 41,975, the read-out scale 61 is correlated to the moisture content of the material 11.

The system of the present invention has advantages over the prior disclosed systems in that with a single channel amplifying and detecting system only the ratio of the high and low frequency signals is important, and this ratio is reduced to unit. Consequently, changes in gain of the system, or non-linearities that may be found in a simple detector will affect both signals similarly leaving the result unchanged. Also synchronous demodulation of the two signals is not required to separate the two signals for application to separate detectors. Finally the present invention eliminates the need for filters and for choppers used in the signal separation system, and for a chopper at the servo amplifier input.

Although certain and specific embodiments have been described herein, modifications may be made thereto without departing from the true spirit and scope of the invention as set forth in the appended claims. For example, it should be noted that although the probe is called a capacitance probe, the dielectric constant of the material being measured may have an imaginary (i.e., resistance) component and the probe electrodes need not be insulated from the material being measured.

What is claimed is:

1. A system for determining a property of dielectric material comprising: a measuring probe having spaced electrodes for coupling said probe to said material, first signal generating means for generating a high frequency signal, second signal generating means for generating a low frequency signal, means for alternately energizing said measuring probe with said high and low frequency signals at a frequency of alternation substantially lower than said low frequency, means connected to said measuring probe for deriving a third signal comprising a first component which is a function of the signals developed on said probe by said material at said high frequency and a second component which a function of the signals developed on said probe by said material at said low frequency, said first and second components occurring sequentially, alternating at said frequency of alternation, and means responsive to the alternating current component of said third signal which represents the difference in amplitude of said first and second components to vary the amplitude of the output of one of said first and second signal generating means in such directions as to reduce said difference to a minimum, and means for indicating said property as a function of said amplitude of the output of said one of said signal generating means.

2. A system for determining the moisture content of a dielectric material comprising: a measuring probe having spaced electrodes for coupling said probe to said material, first signal generating means for generating a high frequency signal, second signal generating means for generating a low frequency signal, means for alternately energizing said measuring probe with said high and low frequency signals at a frequency of alternation substantially lower than said low frequency, means connected to said measuring probe for deriving a third signal comprising a first component which is a function of the signals developed on said probe by said material at said high frequency and a second component signal which is a function of the signals developed on said probe by said material at said low frequency, said first and second components occurring sequentially, alternating at said frequency of alternation, means responsive to the alternating current component of said third signal which represents the difference in amplitude of said first and second components to vary the amplitude of the output of one of said first and second signal generating means in such direction as to reduce said difference substantially to zero, and means for indicating the amplitude of said output of said one of said first and second signal generating means to provide an indication of said moisture content of said dielectric material.

3. A system for determining a property of dielectric material comprising: a measuring probe having spaced electrodes for coupling said probe to said material, first signal generating means for generating a high frequency signal, second signal generating means for generating a low frequency signal, means for alternately energizing said measuring probe with said high and low frequency signals at a frequency of alternation substantially lower than said low frequency means connected to said measuring probe for deriving a continuous D.C. signal comprising a first D.C. component signal which is a function of the signals developed on said probe by said material at said high frequency and a second D.C. component signal which is a function of the signals developed on said probe by said material at said low frequency, said first and second D.C. component signals occurring sequentially, alternating at said frequency of alternation, means, including a capacitor coupled to said continuous D.C. signal to produce a third signal responsive to the difference in amplitude of said first and second D.C. signals to vary the amplitude of the output of one of said first and second signal generating means in such direction as to reduce said difference substantially to zero, and means for indicating the amplitude of said output of said one of said generating means to provide an indication of said property of said dielectric material.

4. A system for determining a property of dielectric material comprising: a measuring probe having spaced electrodes for coupling said probe to said material, first signal generating means for generating a high frequency signal, second signal generating means for generating a low frequency signal, means for alternately energizing said measuring probe with said high and low frequency signals at a frequency of alternation substantially lower than said low frequency, means connected to said measuring probe for deriving a continuous D.C. signal comprising a first D.C. component signal which is a function of the signals developed on said probe by said material at said high frequency and a second D.C. component signal of the same polarity which is a function of the signals developed on said probe by said material at said low frequency, said first and second D.C. component signals occurring sequentially, alternating at said frequency of alternation, means for applying the alternating component of said continuous D.C. signal, means for generating a phase reference signal, a servo motor energized by the amplified A.C. component and said phase reference signal and connected to vary the amplitude of the output of one of said first and second signal generating means in such direction as to reduce said alternating component substantially to zero, and read-out means connected to said servo motor for indicating the amplitude of said output of said one of said signal generating means to provide an indication of said property of said dielectric material.

5. A system for determining a property of dielectric material comprising: a measuring probe having spaced electrodes for coupling said probe to said material, first signal generating means for generating a high frequency signal, second signal generating means for generating a low frequency signal, means for alternately energizing said measuring probe with said high and low frequency signals at a frequency of alternation substantially lower than said low frequency, means connected to said measuring probe for deriving a continuous D.C. signal comprising a first D.C. component signal which is a function of the signals developed on said probe by said material at said high frequency and a second D.C. component signal of the same polarity which is a function of the signals developed on said probe by said material at said low frequency, said first and second D.C. component signals occurring sequentially, alternating at said frequency of alternation, a capacitor coupled to said continuous D.C. signal to produce a third signal which alternates at said frequency of alternation when said first and second D.C. component signals are unequal, has an amplitude dependent on the relative difference between said first and second D.C. component signals, and a phase polarity dependent on which of said D.C. component signals is greater, a potentiometer for varying the amplitude of the output of one of said signal generators, a servo motor system responsive to said third signal and connected to operate said potentiometer in such direction as to reduce the difference in amplitude of said first and second D.C. component signals substantially to zero, and read-out means connected to said servo motor system for indicating the position of said potentiometer as an indication of said property of said dielectric material.

6. A system for determining a property of a dielectric material comprising: a measuring probe having spaced electrodes for coupling said probe to said material, first signal generating means for generating a high frequency signal, second signal generating means for generating a low frequency signal, means for alternately energizing said measuring probe with said high and low frequency signals at a frequency of alternation substantially lower than said low frequency, means connected to said measuring probe for deriving a third signal comprising a first component which is a function of the signals developed on said probe by said material at said high frequency and a second component which is a function of the signals developed on said probe by said material at said low frequency, said first and second components occurring sequentially and alternating at said frequency of alternation, and means responsive to the alternating current component of said third signal which represents the difference in amplitude of said first and second components for varying the amplitude of the output of one of said first and second signal generating means whose generated signal energizes said probe.

7. A system for determining a property of a dielectric material comprising a measuring probe having spaced electrodes for coupling said probe to said material, first signal generating means for generating a high frequency signal, second signal generating means for generating a low frequency signal, a source of a phase reference signal, means switched in response to said phase reference signal for alternately energizing said measuring probe with said high and low frequency signals at a frequency of alternation substantially lower than said low frequency, means coupled to said measuring probe for deriving a fourth signal having a first component which is a function of the signals developed on said probe by said material at said high frequency and a second component which is a function of the signals developed on said probe by said material at said low frequency, said fourth signal having one of two opposite phase relationships to said phase reference signal depending on the relative magnitudes of said two components, and means responsive to said phase relationships of said fourth signal for varying the output of one of said first and second signal generating means whose generated signal energizes said probe.

8. Apparatus as in claim 7 wherein said phase relationship responsive means comprises a phase-sensitive servo motor and a potentiometer driven by said motor for increasing the amplitude of said one signal generating means when said fourth signal has one of said phase relationships and for decreasing said amplitude when said fourth signal has the opposite phase relationship.

References Cited

UNITED STATES PATENTS

| | | | |
|---|---|---|---|
| 2,896,074 | 7/1959 | Newson et al. | 324—79 X |
| 3,046,537 | 7/1962 | Dow | 324—61 X |
| 3,155,901 | 11/1964 | Hanken | 324—57 |

FOREIGN PATENTS

| | | |
|---|---|---|
| 622,470 | 4/1946 | Great Britain. |

WALTER L. CARLSON, *Primary Examiner.*

FREDERICK M. STRADER, *Examiner.*

W. H. BUCKLER, A. E. RICHMOND, E. E. KUBASIEWICZ, *Assistant Examiners.*

UNITED STATES PATENT OFFICE
CERTIFICATE OF CORRECTION

Patent No. 3,327,207          Dated June 20, 1967

Inventor(s) A. Norwich

It is certified that error appears in the above-identified patent and that said Letters Patent are hereby corrected as shown below:

Column 1, line 52, "Lieu" should read --Liu--

Column 4, claim 2, line 71, delete "signal"

Signed and sealed this 3rd day of August 1971.

(SEAL)
Attest:

EDWARD M. FLETCHER, JR.          WILLIAM E. SCHUYLER, JR.
Attesting Officer                Commissioner of Patents